UNITED STATES PATENT OFFICE.

AUGUSTE BOIDIN, OF SECLIN, FRANCE, ASSIGNOR TO THE SOCIETE ANONYME AMYLO, OF ANTWERP, BELGIUM.

PROCESS FOR RENDERING CARBOHYDRATES SOLUBLE.

No. 906,188.  Specification of Letters Patent.  Patented Dec. 8, 1908.

Application filed May 23, 1904. Serial No. 209,392.

*To all whom it may concern:*

Be it known that I, AUGUSTE BOIDIN, a citizen of the French Republic, residing at Seclin, Department du Nord, in the French Republic, have invented certain new and useful Improvements in Processes for Rendering Carbohydrates Soluble; and I do hereby declare the following to be a full, clear, and exact description of the invention, such as will enable others skilled in the art to which it appertains to make and use the same.

This invention has relation to the production of carbo-hydrates from amylaceous raw materials such as cereals, potatoes and the like, which carbo-hydrates as is well known are insoluble in water, and are or may be obtained by cooking or boiling the raw material under normal atmospheric pressure, or under higher pressures for distilling processes. As is also well known, these carbo-hydrates congeal or form a jelly on or before cooling, thus forming a non-filtrable, more or less solid mass, which in certain arts and manufactures, and particularly in the manufacture of spirits, has to be further treated in order to convert it into a fermentable mash, involving considerable labor and expense.

I have discovered that the congealing or jellying of the cooked raw material or starch is controlled by the action of the mono- di- and tri-phosphates of the metals of the alkalies and alkaline earths, such as the di- and tri-metallic phosphates of sodium, potassium, calcium and magnesium usually present in amylaceous materials, and that these latter phosphates not only materially retard the cooking of the material by preventing the liquefaction of the starch, but also convert an appreciable portion of the starch into caramel, thus entailing an appreciable loss in starch, particularly if the carbo-hydrate is to be used for the manufacture of spirits, in view of the fact that caramel is not fermentable, the action of such phosphates upon starch at boiling temperatures being similar to the action of bi-potassium phosphate on glucose. This caramelization is particularly noticeable in maize, since this acts as an alkali, and is undoubtedly due to the bi-phosphate of potash contained in the grain.

My observations on the action of maize have led me to believe that the caramelization is due to the polybasic alkaline phosphates, and this I have demonstated by the following experiments: Carefully wash with distilled water a quantity of starch to wash out the polybasic alkaline phosphates, then heat under pressure, and there will be no caramelization. Add a trace of acid to another sample, heat as before; no caramel will appear; then put into a like sample containing acid a little bi-phosphate of potash, heat under pressure, and the starch will become very brown; finally, to similar sample add sufficient acid to transform the bi-phosphate into mono-phosphate and the caramelization will disappear completely when heated. Now, if the phosphate be replaced by caustic soda in a chemically equivalent quantity, the result will be precisely the same.

It will be further found that the changes produced by the polybasic phosphates are not in color alone, the products obtained are quite different. Starch containing $HK_2PO_4$ is very viscous after being heated for three hours at four atmospheres pressure; but, in case the non-acid soluble phosphate has been removed, or been converted into the mono-phosphate, the starch magma becomes limpid and filters as quickly as water.

My invention has for its object a method of treating amylaceous raw materials or starch, whereby the action of the phosphates of the metals of the alkalies and of the alkaline earths, above referred to, is neutralized, and a so-called, solution of carbo-hydrate is obtained that will not congeal or form a jelly, which is perfectly limpid and filtrable, even when only two parts by weight of water to one part by weight of starch are used in the cooking, and that will remain fluid and filtrable for several months, while caramelization of the starch is also avoided.

By exhaustive experiments I have found that calcium phosphate does not retard the liquefaction to such a great degree as magnesium phosphate, which latter greatly retards liquefaction, and the reason for this is that part of the calcium phosphate under the conditions of treatment is converted into another form, as shown by the following example: Produce a precipitate of calcium phosphate in the cold by mixing chemically equivalent quantities of sodium phosphate $Na_3PO_4$ and calcium chlorid, and we have—

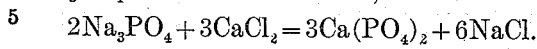
$$2Na_3PO_4 + 3CaCl_2 = 3Ca(PO_4)_2 + 6NaCl.$$

Now, heat to 100° or under pressure and filter hot, and the filtrate contains $CaH_4(PO_4)_2$ while the precipitate contains a product richer in calcium oxid (CaO) than the tricalcium phosphate $Ca_3(PO_4)_2$ and of the formula $(PO_4)_2Ca_3 2CaO$. The former does not prevent liquefaction, while the latter, which has a slightly alkaline reaction does not retard liquefaction because of its very feeble reaction.

My invention may be carried out in various ways depending upon the amylaceous material treated, whether starch or raw material, and upon the character of the phosphates present therein, as it is well known that even the starch of commerce contains an appreciable percentage of those phosphates which will retard liquefaction, as otherwise it would not form a jelly when boiled. But, that my invention may be fully understood, I will describe the same in detail.

The action of the metals of the alkalies and alkaline earths, with the exception of the tricalcium phosphate, i. e., the di- and tri-metallic phosphates, may be neutralized or counteracted by converting them into mono-metallic phosphates, as follows: The more or less finely divided amylaceous material, i. e. crushed undecorticated grain or unskinned potatoes cut into pieces, is steeped for about from one to one-and-a-half hours in cold or tepid water in the proportions of one or two parts by weight of water to one part by weight of amylaceous material, the water being acidulated with a mineral acid, preferably hydrochloric acid of about 22° B., the proportion of which depends upon the proportion of phosphates present, and which may be readily determined beforehand, whereby the latter are converted into mono-metallic phosphates, as shown by tests with sulfo-conjugated alizarin, which at the beginning of the steeping shows the mixture to be acid, and after from one to one-and-one-half hours, neutral or alkaline. There is therefore no free mineral acid present in the mixture to corrode the cookers, while the mono-metallic phosphates do not antagonize the liquefaction, i. e., promote congelation or the formation of a jelly, so that when the mixture is cooked the carbo-hydrate will be fluid or limpid and will remain so, while the time for cooking is materially shortened, for instance, from two-hours-and-a-half to three hours under pressure, to one hour, a sample of 50 cc. of the liquid yielding from 150 to 200 cc. of filtrate.

On steeping the amylaceous material in acidulated water of normal or slightly above normal temperatures, the acid will not attack the hull of cereals, when cereals are used as a raw material, for instance, for the manufacture of spirits, while on the other hand, if used hot, the acid would attack the hulls to a great extent and dissolve the cellulose of the hulls instead of combining with the polybasic phosphates.

Inasmuch as polybasic phosphates, except calcium and magnesium phosphates, are soluble in water, while the calcium and magnesium phosphates are soluble in water charged with carbonic acid, the objects aimed at can be attained by leaching out the phosphates with water charged with carbonic acid, and the material thus freed from the phosphates is then cooked with fresh water, though this is a troublesome procedure, but on the other hand, potassium, sodium and magnesium phosphates can be decomposed by calcium chlorid, or by a chlorid of a heavy metal, such as iron, aluminium, lead, copper &c.; in the case of calcium chlorid and magnesium and sodium phosphates the reactions take place according to the following equations:

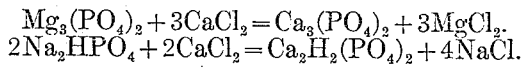
$$Mg_3(PO_4)_2 + 3CaCl_2 = Ca_3(PO_4)_2 + 3MgCl_2.$$
$$2Na_2HPO_4 + 2CaCl_2 = Ca_2H_2(PO_4)_2 + 4NaCl.$$

Thus it will be seen that the magnesium and sodium phosphates that retard the liquefaction are converted into calcium phosphates that do not retard the liquefaction, said phosphates being decomposed by heat into— $CaH_4(PO_4)_2$ and $(PO_4)_2Ca_3nCaO$, so that the phosphates can therefore be converted at boiling temperatures by means of calcium chlorid, into potassium, sodium or magnesium chlorid, free phosphoric acid and poly-basic phosphates of calcium, and as none of these products antagonizes liquefaction, i. e., promotes congelation or the formation of a jelly, a perfectly liquid product is obtained which will remain liquid after cooling for a comparatively great length of time, provided there is neither an excess of free acid nor of alkali present.

Example: Indian corn 100 kgs. water 200 kgs. and 1 kg. calcium chlorid are boiled for three hours under a pressure of three kgs.; in this case the steeping of the amylaceous material prior to cooking the same is not necessary, as the calcium chlorid does not attack the cookers. Inasmuch as distilled water is hardly ever used by distillers for the preparation of the mash, and as most waters contain calcium carbonate, if hydrochloric acid is used in the steeping of amylaceous material before cooking, this carbonate is converted into calcium chlorid by the hydrochloric acid used, and the results above described relatively to the use of calcium chlorid ensue.

From the equations and the example above given it will be seen that the proportion of calcium chlorid necessary to produce the reactions is very small, and most waters contain sufficient quantity of the carbonate to produce a sufficient proportion of calcium chlorid.

Example: 100 kg. of amylaceous material is steeped in 200 kg. cold or tepid water, to which from 500 to 600 gr. hydrochloric acid of about 22° B., equal to 250 gr. gaseous hydro-chloric acid, is added.

The calcium carbonate is converted into calcium chlorid

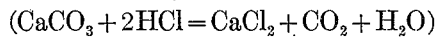

the chlorid converting the polymetallic phosphates into calcium phosphates, which do not induce congelation or jellying.

Rye contains, as is well known, a greater quantity of di- and tri-metallic phosphates than other cereals, therefore the quantity of hydrochloric acid or of calcium chlorid must be increased accordingly.

In the treatment of potatoes, which contain a large proportion of potassium salts, I preferably resort to a preliminary alkaline diffusion in a manner similar to the diffusion of beets in the manufacture of sugar, the potatoes being likewise cut up into more or less small pieces, and thus remove the greater part of the phosphates, the remaining alkali being then neutralized by a suitable quantity of acid added to the sliced potatoes before cooking them, three quarters of an hour sufficing for the cooking. Finally, the phosphates soluble in water may be removed by systematic diffusion, and in order to insure the solution of the magnesium phosphate the water is saturated with carbonic acid, the method of diffusion being substantially the same as that resorted to with beets in the manufacture of sugar.

I claim—

1. In the process of making distilled spirits the step which comprises treating amylaceous material, adding thereto a suitable agent sufficient to convert the phosphates therein into mono-phosphates and maintain the mash substantially neutral.

2. In the process of making distilled spirits, the step which comprises adding a suitable agent thereto to transform the alkaline phosphates that promote the formation of a jelly into mono-phosphates to produce a neutral mash.

3. In the process of making distilled spirits, the step which comprises treating amylaceous material by adding a suitable agent to transform the alkaline phosphates that promote the formation of a jelly into mono-phosphates of another alkaline metal to produce a neutral product.

4. In the process of making distilled spirits, the step which comprises treating amylaceous material, reacting upon the phosphates contained in the mash with a suitable salt of a metal sufficient to convert the phosphates into mono-phosphates of said metal and soluble salts of the bases contained in the phosphates to produce a neutral product.

5. In the process of making distilled spirits, the step which comprises treating amylaceous material, reacting upon the phosphates contained therein with a metallic chlorid in sufficient quantity to convert the phosphates into mono-phosphates of the metal and chlorids of the metals that formed the bases of said phosphates to produce a neutral product.

In testimony that I claim the foregoing as my invention, I have signed my name in presence of two subscribing witnesses.

AUGUSTE BOIDIN.

Witnesses:
VALERY MOUSAIN,
JOSEPH DE LA VALLÉE.